Oct. 12, 1965 G. L. CLARK ETAL 3,212,011

TIME DELAY CIRCUIT

Filed Feb. 27, 1961 2 Sheets-Sheet 1

GEORGE L. CLARK
JOHN J. HICKEY
INVENTORS

BY Jerry G. Dinardo
AGENT
Albert Rosen
ATTORNEY

TIME DELAY CIRCUIT

GEORGE L. CLARK
JOHN J. HICKEY
INVENTORS
BY Jerry A. Dinardo
AGENT
Albert Rosen
ATTORNEY

United States Patent Office 3,212,011

Patented Oct. 12, 1965

3,212,011

TIME DELAY CIRCUIT

George L. Clark and John J. Hickey, Hawthorne, Calif., assignors, by mesne assignments, to TRW Inc., a corporation of Ohio Filed Feb. 27, 1961, Ser. No. 92,083

12 Claims. (Cl. 328—67)

This invention relates generally to wave generating circuits and particularly to improvements in electronic time delay generators.

It is often desired to make use of timing circuits in which a timing waveform is initiated only after a precise interval following the occurrence of a given event. When such circuits are used in ultra high speed photography, it is necessary that the time jitter or variation in time delay be maintained at a minimum in order to insure correct timing of exposures. The time jitter of any electronic time delay generator is determined largely by the shape of the timing waveform that is generated. A slowly rising timing waveform produces more jitter than a rapidly rising waveform. Furthermore, longer time delays are usually accompanied by slower rising timing waveforms and larger jitter times.

Accordingly, it is a principal object of this invention to reduce the rise time and decrease the time jitter of a timing waveform.

A further object is to provide an easily variable time delay circuit capable of generating a timing waveform which rises as fast for long time delays as for short time delays.

The foregoing and other objects are realized through the use of an oscillatory circuit having two different frequency modes of operation. During the first half cycle of operation, the circuit oscillates at a frequency, determined by the circuit parameters, that corresponds to the desired delay time. At the termination of the first half cycle, the circuit parameters are changed automatically to cause oscillation at a much higher frequency and amplitude. The first half cycle of the second frequency mode thus produces a fast rising waveform, which is used as the timing pulse.

According to one embodiment, a time delay circuit includes a direct current voltage source connected in series with a capacitor, an inductor, and a diode. A switching device, such as a thryratron, is connected across the voltage source. During the off or open condition of the thyratron, the capacitor is charged to the full value of the source voltage. Upon the application of a trigger pulse to the thyratron, the latter is switched to a conducting condition, thereby providing a path through which the capacitor is allowed to discharge. An oscillatory discharge current flows for one-half cycle in the current conducting direction of the diode. The appearance of voltage across the diode is delayed during this first half cycle.

After the first half cycle of current flow, when the current would normally reverse direction, the diode stops conducting, and in place of its low forward resistance, the small capacitance of the diode is introduced into the resonant circuit. The circuit then becomes resonant at a much higher frequency. During the first half cycle of the new oscillation frequency mode, the voltage across the diode rises abruptly to a value nearly twice the original supply voltage. The output voltage waveform taken across the diode is thus a steep rising pulse accurately delayed from the time of firing of the thyratron switching device.

In accordance with another embodiment, means are provided for delaying the opening of the diode beyond the first half cycle of current flow. As a consequence, the voltage developed across the diode, following the reversal of current therethrough, rises to a substantially higher magnitude and thus has an even more steeply rising front than in the previous embodiment.

Figure 1:
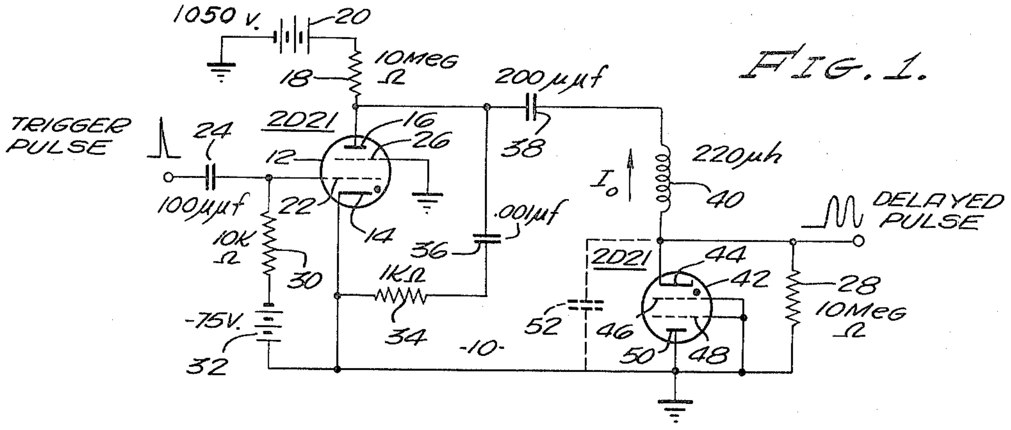
FIG. 1 is a schematic diagram of one form of delay pulse generator according to the invention.

Referring to FIG. 1, which is a schematic diagram of one embodiment of the invention, a delay pulse generator 10 includes a switching device 12, such as a thyratron gas discharge tube. The switching tube 12 has its cathode 14 at ground reference potential and its anode 16 maintained at a suitable positive potential by connection through a plate resistor 18 to a direct current voltage source 20. Other electrode elements of the switching tube 12 include a trigger or control electrode 22 for reception of a positive trigger pulse through a coupling capacitor 24, and a shield electrode 26, which is maintained at cathode or ground potential. The control electrode 22 is maintained at a high negative potential by connection through a grid resistor 30 to a negative bias source 32. The bias source 32 is sufficient in magnitude to maintain the switching tube normally non-conducting.

The switching tube 12 may comprise a type 2D21 miniature thyratron, for example. When the tube elements are so connected, the thyratron tube 12 can be switched to a fully conducting condition in about 50 nanoseconds (1 nanosecond$=1\times10^{-9}$ seconds) after the application of a trigger pulse to the control electrode 22.

A current bias circuit includes a resistor 34 and a capacitor 36 serially connected between the cathode 14 and the anode 16.

An oscillatory circuit is connected across the thyratron tube 12. The oscillatory circuit includes a main capacitor 38, an inductor 40, and a unidirectional current conducting device or diode 42 connected in series. A load resistor 28 is connected across the diode 42. The diode 42 is arranged to conduct current flowing in a direction from the cathode 14 of the switching tube 12 through the inductor 40 and the main capacitor 38 to the anode 16 of the switching tube 12, and to block current flowing in the opposite direction.

The diode 42 is preferably a thyratron tube, such as type 2D21, with its cathode 44 connected through the inductor 40, main capacitor 38, and voltage dropping resistor 18 to the positive terminal of the voltage source 20. The grid 46, shield electrode 48, and anode 50 of the tube are connected together and to the negative terminal of the voltage source 20. The advantages of using a thyratron for the diode 42 are its ability to conduct high currents in the forward direction, its ability to withstand high voltages in the reverse direction, and its low resistance in the resonant circuit.

The time delay generator 10 thus includes a series charging circuit composed of the voltage source 20, plate resistor 18, main capacitor 38, inductor 40 and load resistor 28, when the switching tube 12 is nonconducting. When the switching tube 12 conducts, it forms a path for a discharge circuit, which includes besides the switching tube 12, the main capacitor 38, inductor 40, and diode 42.

The operation of the time delay generator 10 will now be described. In the absence of a trigger pulse on the control electrode 22 of the switching tube 12, the latter assumes a non-conducting condition. The main capacitor 38 charges up to the full voltage of the source 20, through one charging circuit including the source 20, plate resistor 18, main capacitor 38, inductor 40 and load resistor 28. Similarly, current bias capacitor 36 charges up to the full voltage of the source 20 through another charging circuit including the source 20, plate resistor 18, capacitor 36, and resistor 34.

When a trigger pulse is applied to the control electrode 22 of the switching tube 12 and through the coupling capacitor 24, the tube 12 is fired to a conducting condition, thereby providing a low resistance path between the cathode 14 and the anode 16. The appearance of the low resistance path enables the current bias capacitor 36 to discharge through the path including the tube 12 and resistor 34. Assuming conventional current flow, the direction of flow of this current, which will be termed the bias current $I_B$, is from the bias capacitor 36 to the anode 16, through the switching tube 12 to the cathode 14, through the bias resistor 34 and back to the bias capacitor 36. In addition, the conducting conditon of the switching tube enables the main capacitor 38 to discharge through a second path including the switching tube 12, diode 42 and inductor 40. The presence of the inductor 40 in the second path gives rise to an oscillatory current $I_o$, whose initial direction of flow is in the low impedance or current conduction direction of the diode 42, that is from the anode 50 to the cathode 44. The path of the oscillatory current $I_o$ is from the main capacitor 38 to the anode 16 of the switching tube 12, to the cathode 14, to the anode 50 of the diode 42, to the cathode 44, through the inductor 40 and back to the main capacitor 38.

Figure 2:
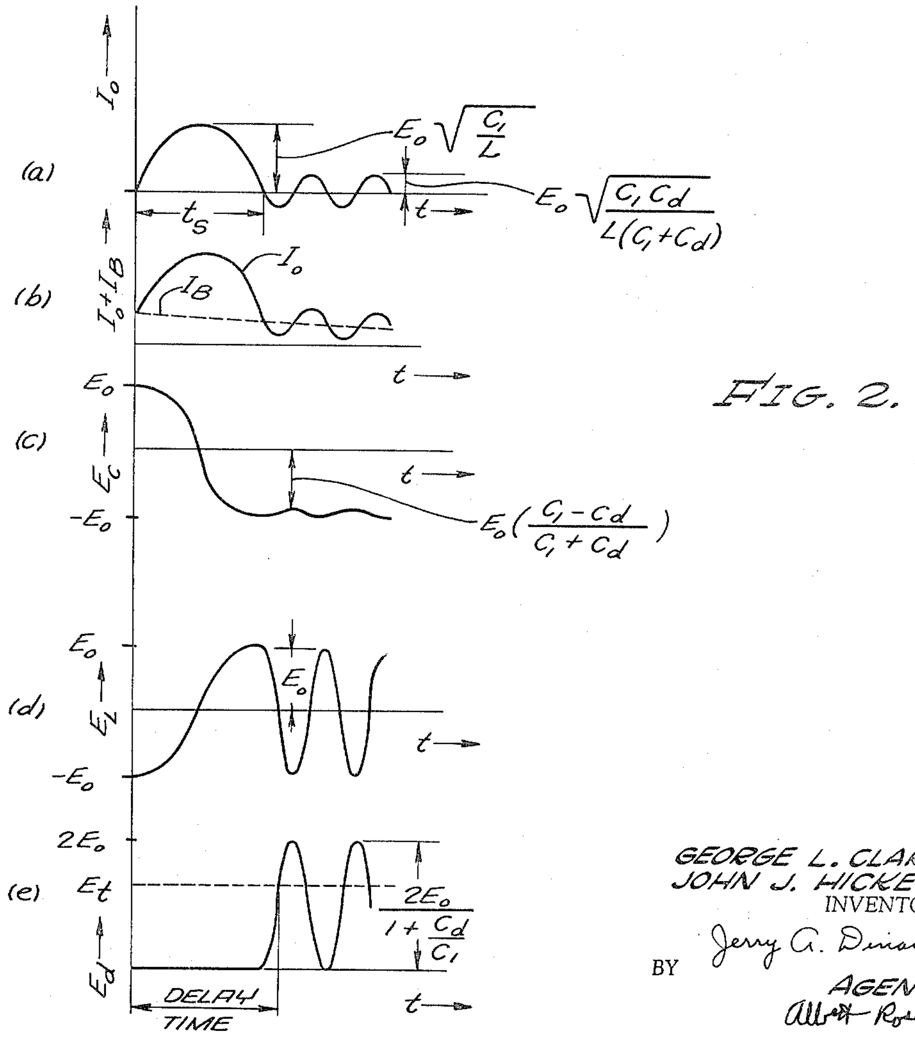
FIG. 2 is a series of graphs of waveforms useful in explaining the operation of the delay pulse generator of FIG. 1.

Reference is now made to the graphs of FIG. 2 which depict the current and voltage waveforms associated with the various circuit elements. Graph 2(*a*) illustrates the oscillatory current $I_o$ flowing in the oscillatory circuit. Graph 2(*b*) illustrates the composite bias and oscillatory currents $I_B$ and $I_o$, respectively, flowing in the switching tube 12; Graph 2(*c*) illustrates the voltage across the main capacitor 38. Graph 2(*d*) illustrates the voltage across the inductor 40. Graph 2(*e*) illustrates the output voltage across the diode 42.

It is seen in graph 2(*a*) that during the first half cycle of current flow, the oscillatory current $I_o$ varies at a sinusoidal rate that is determined by the circuit parameters, namely, the inductance of the inductor 40 and the capacitance of the main capacitor 38. The current $I_o$ can be expressed by the following equation, $$I_o(t)=\frac{E_o}{\omega_1 L}\sin \omega_1 t$$

where $E_o$ is the voltage of the source 20, L is the inductance of inductor 40, and $$\omega_1=\frac{1}{\sqrt{LC_1}}$$

where $C_1$ is the capacitance of the main capacitor 38 and $\omega_1$ is the angular frequency in radians per second.

The maximum values of the voltages $E_c$ and $E_L$ are equal to the source voltage $E_o$, and the voltages $E_c$ and $E_L$ are at all times equal and opposite to each other. Since the diode 42 is conducting, it acts as a short circuit, and hence no voltage is developed thereacross as shown in graph 2(*c*).

It is noted in graph 2(*b*) that the current through the switching tube 12 has two components, namely the oscillatory current $I_o$ and the bias current $I_B$. The bias current $I_B$ has a long time constant and is of sufficient magnitude to maintain the switching tube 12 conducting when the oscillatory current $I_o$ reverses direction. Since the switching tube 12 can conduct current only in one direction, it can not conduct the oscillatory current $I_o$ by itself during a negative excursion, but will conduct such current when it is superimposed on a greater positive current, such as the bias current $I_B$.

At the end of the first half cycle of oscillation, the capacitor 38 is fully charged with a polarity opposite to its original polarity, as shown in graph 2(*c*), and has a tendency to reverse the direction of the oscillatory current $I_o$. Since the diode 42 will not conduct current in the reverse direction, it presents a high reactive impedance, in the form of a low diode capacitance 52, shown in phantom in FIG. 1. The circuit parameters now are composed of the main capacitor 38, the inductor 40 and the diode capacitance 52, which preferably has a very small magnitude as compared with the main capacitor 38. Since the diode capacitance 52 is much smaller than that of the main capacitor 38, the frequency of oscillation will now be controlled primarily by the diode capacitance. Accordingly, the frequency will increase to a value $\omega_2$ determined by the following expression, $$\omega_2=\frac{1}{\sqrt{L\left(\frac{C_1\times C_d}{C_1+C_d}\right)}}$$

where $C_d$ is the capacitance of the diode 42.

Assuming that the diode capacitance 52 is 1/15 that of the main capacitor 38, the new frequency $\omega_2$ will be four times that of the original frequency $\omega_1$. The new current $I_o'$, shown in the right half portion of graph 2(*a*), is given by the following expression, $$I_o'(t)=\frac{-E_o}{\omega_2 L}\sin \omega_2(t-t_s)$$

where $t_s$ is the time at which the diode 42 stops conducting.

Under the new operating conditions, the main capacitor 38 acts as a substantially constant voltage source of magnitude approximately $-E_o$, with a small ripple or variation due to its small internal reactance, superimposed on the constant voltage, as shown in graph 2(*c*). The main capacitor voltage $E_c$ drives the inductor 40 and the diode capacitance 52 into oscillation, the voltage $E_d$ across the diode 42 being substantially equal and opposite to the sum of the voltage $E_L$ across the inductance 40 and the voltage $E_c$, as shown in FIG. 2. The maximum voltage across the diode 42 is equal to $$\frac{2E_o}{1+\frac{C_d}{C_1}}$$

It is seen that when $C_1=15C_d$, the maximum diode voltage $E_d$ is slightly less than $2E_o$, the peak voltage $E_L$ across the inductance is $E_o$, and the voltage $E_c$ across the main capacitor 38 is the negative of the sum of the two voltages $E_L$ and $E_d$.

The voltage $E_d$ across the diode 42 constitutes the output voltage of the delay generator. It is seen from graph 2(*e*) that the output pulse is delayed by a period equal at least to one half period of the first oscillation frequency $\omega_1$, the exact amount of the delay depending upon the time required for the diode voltage to reach a certain useful threshold voltage $E_t$, shown as a dashed line in graph 2(*e*).

It is noted that the time delay of the output voltage is determined primarily by the inductance and capacitance of the inductor 40 and main capacitor 38, respectively. The time for the diode voltage $E_d$ to rise to the threshold value $E_t$ is determined by the ratio of the capacitances of the main capacitor 38 and the diode 42. For example, if the diode capacitance is made smaller, the second oscillation frequency $\omega_2$ will increase, thereby producing a steeper wavefront on the output voltage waveform $E_d$, and decreasing the time required to reach the threshold voltage $E_t$.

Typical values of the voltages and circuit parameters are listed in the following table and are applied to the circuit of FIG. 1.

| | |
|---|---|
| Source 20, volts | 1050 |
| Source 32, volts | —75 |
| Capacitor 24, micromicrofarads | 100 |
| Capacitor 36, microfarad | .001 |
| Capacitor 38, micromicrofarads | 200 |
| Resistor 18, megohms | 10 |
| Resistor 28, megohms | 10 |
| Resistor 30, kilohms | 10 |
| Resistor 34, kilohm | 1 |
| Inductor 40, microhenrys | 220 |

Under the conditions specified above, the period for one cycle of the first oscillating current $I_o$ at the first frequency $\omega_1$ is approximately 0.66 microsecond. The time constant of the bias current $I_B$ circuit is equal to the product of the resistance of resistor 34 and the capacitance of capacitor 36, which turns out to be 1 microsecond. Thus, the time constant of this circuit is substantially longer than a half period of the first frequency $\omega_1$. In the example given, the time constant is three times the half period of the frequency. The peak amplitude of the current $I_o$ is approximately 1 ampere. The maximum amplitude of the bias current $I_B$, which is equal to the initial voltage of capacitor 36 divided by the resistance of resistor 34, is approximately 1 ampere. According to the RCA Electron Tube Handbook, volume HB–3, the peak current rating of a type 2D21 thyratron is .5 ampere, and the tube will handle up to 10 amperes peak current under pulse operation. Under the operating conditions given in the above example, the tube conducts nearly 2 amperes of peak current. Accordingly, the thyratron tube 12 operates under a very high level of ionization throughout and beyond the entire delay period.

The rise time to the threshold voltage $E_t$ can be reduced even further by means designed to increase the output voltage $E_d$. By minimizing the rise time, the jitter time is correspondingly reduced. Briefly, the output voltage $E_d$ can be increased by delaying the opening of the diode 42 for a period of time beyond the end of the first half cycle of current of the first oscillation frequency $\omega_1$.

Figures 3, 4:
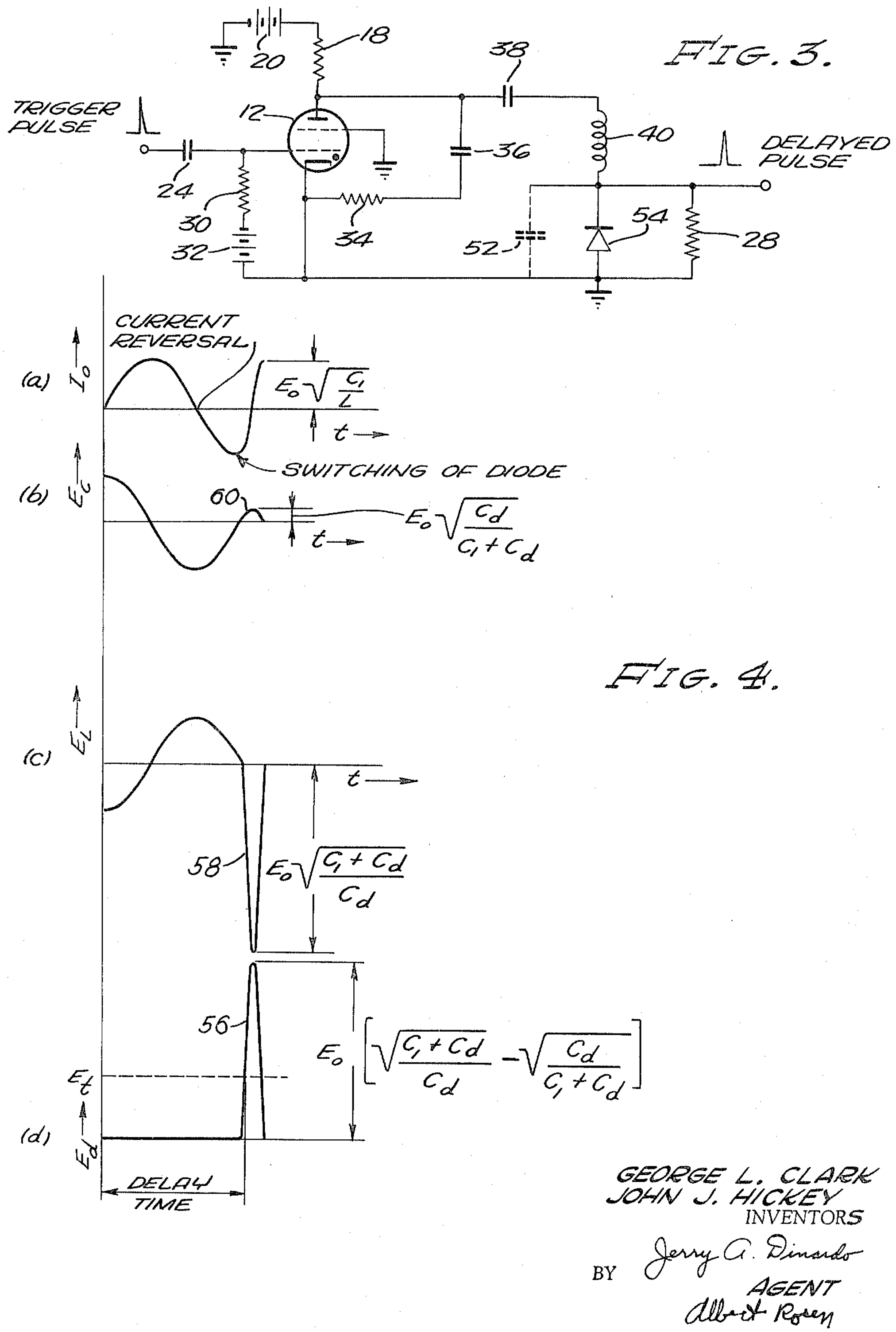
FIG. 3 is a schematic diagram of another form of delay pulse generator according to the invention.
FIG. 4 is a series of graphs of waveforms useful in explaining the operation of the delay pulse generator of FIG. 3.

Reference is now made to FIG. 3 for a description of another embodiment of the invention which includes means for delaying the opening of the diode 42. In this embodiment a solid state diode 54 replaces the thyratron tube 42 of the previous embodiment. The inherent charge carrier storage of the diode 54 is used to delay the opening of the diode 54.

The effect of the delayed opening of the diode 54 on the operation of the circuit can be seen by referring to the waveforms depicted in FIG. 4, wherein graph 4(*a*) shows the oscillatory current $I_o$, and graphs 4(*b*), 4(*c*), and 4(*d*) show the voltages developed across the main capacitor 38, inductor 40, and diode 54, respectively. In the example shown, it is assumed that the opening of the diode 54 is delayed, after one-half cycle of current flow, by a period corresponding to 90°, or one-quarter of one cycle of the first oscillating current $I_o$.

Referring now to FIG. 4, it is noted that at the time of opening of the diode 42, the current $I_o$ is at its peak negative value and the voltages $E_c$ and $E_L$ across the main capacitor 38 and the inductor 40 are both zero. More importantly, the energy stored in the inductor 40 is at a maximum and the energy stored in the main capacitor 38 is at a minimum. This means that the inductor 40 is ready to release its energy to the circuit. As the new energy source, the inductor 40 now sees the main capacitor 38 as a relatively low reactive impedance and the inductor 40 and diode 54 as relatively high reactive impedances. Hence most of the energy is released to the diode 54 and very little energy is released to the main capacitor 38. Accordingly, there is produced a large positive voltage pulse 56 across the diode 54, as shown in graph 4(*d*), as well as a negative voltage pulse 58 across the inductor 40, shown in graph 4(*c*), but only a small voltage pulse 60 is produced across the main capacitor 38, as shown in graph 4(*b*). The voltage developed across the diode 54 is considerably higher (by almost a factor of 2) than it was in the previous instance when the diode was allowed to open at the end of the first half cycle of the initial oscillating current. As a result, the rise time to the threshold voltage $E_t$ is reduced, even though the delay time is increased.

The amplitudes of the various voltages developed across the main capacitor 38, the inductor 40, and the diode 54, respectively, are as follows:

$$E_c = E_o \sqrt{\frac{C_d}{C_1 + C_d}}$$

$$E_L = E_o \sqrt{\frac{C_1 + C_d}{C_d}}$$

$$E_d = E_o \left[ \sqrt{\frac{C_1 + C_d}{C_d}} - \sqrt{\frac{C_d}{C_1 + C_d}} \right]$$

In regard to the plate resistor 18 and load resistor 28, it is noted that they should be relatively high in resistance. The plate resistor 18, for example, should be high enough to prevent any appreciable current from being drawn by the switching tube 12 from the voltage source 20. The load resistor 28 should be high enough to prevent excessive loading down of the diodes 42 and 54.

It is now apparent that by means of the circuit of the invention, timing waveforms of variable delay are produced with fast rise times and minimum jitter times.

The embodiments of the invention in which an exclusive property or privilege is claimed are defined as follows:

1. A time delay circuit comprising: a thyratron switching tube including a cathode, a grid and an anode; a first circuit connected across the anode and cathode of said thyratron switching tube and including a capacitor, an inductor, and a diode connected in series with each other to form a resonant circuit, and a first relatively high resistance connected in parallel with said diode, said diode being connected to present a low impedance to current flowing in one direction in said first circuit through said thyratron switching tube, said first circuit being resonant, when current flows in said one direction, at a first frequency determined by the capacitance of said capacitor and the inductance of said inductor, and said first circuit being resonant, when current flows opposite said one direction, at a second frequency that is higher than said first frequency and that is determined by the capacitances of said capacitor and said diode and the inductance of said inductor; a second circuit connected across said thyratron switching tube and including a direct current voltage source having its negative terminal connected to the cathode of said thyratron switching tube, and a second relatively high resistance connected between the anode of said thyratron switching tube and the positive terminal of said direct current voltage source; means including a bias capacitor and a resistor connected in series across the anode and cathode of said thyratron switching tube, for forming a current discharge path through said tube characterized by a long time constant relative to the half period associated with said first frequency; and an input circuit connected across the grid and cathode of said thyratron switching tube, said input circuit including means connected to apply a negative bias voltage sufficient to maintain said tube normally nonconducting, and means connected to apply a positive trigger voltage sufficient to overcome said bias and to render said tube conducting.

2. The invention according to claim 1, and further including means for delaying the opening of said diode for a period beyond a half cycle of current flow at said first frequency.

3. The invention according to claim 2, wherein said diode comprises a solid state device having an inherently large charge carrier storage capability.

4. A time delay circuit comprising: a thyratron switching tube including a cathode, a grid and an anode; a first circuit connected across the anode and cathode of said thyratron switching tube and including a capacitor, an inductor, and a diode connected in series with each other to form a resonant circuit, and a first relatively high resistance connected in parallel with said diode, said diode being connected to present a low impedance to current flowing in one direction in said first circuit through said thyratron switching tube, said first circuit being resonant, when current flows in said one direction, at a first frequency determined by the capacitance of said capacitor and the inductance of said inductor, and said first circuit being resonant, when current flows opposite said one direction, at a second frequency that is higher than said first frequency and that is determined by the capacitances of said capacitor and said diode and the inductance of said inductor; a second circuit connected across said thyratron switching tube and including a direct current voltage source having its negative terminal connected to the cathode of said thyratron switching tube, and a second relatively high resistance connected between the anode of said thyratron switching tube and the positive terminal of said direct current voltage source; means including a bias capacitor and a resistor connected in series across the anode and cathode of said thyratron switching tube, for forming a current discharge path through said tube characterized by a long time constant relative to the half period associated with said first frequency; and an input circuit connected across the grid and cathode of said thyratron switching tube, said input circuit including means connected to apply a negative bias voltage sufficient to maintain said tube normally nonconducting, and means connected to apply a positive trigger voltage sufficient to overcome said bias and to render said tube conducting; and means for causing a bias current flow through said thyratron switching tube in said long time constant discharge path during the first cycle of oscillatory current flow at said second resonant frequency that is greater than the oscillatory current flowing in said resonant circuit at said second resonant frequency.

5. A time delay circuit comprising: a thyratron switching tube; a first circuit connected across said switching tube and including a capacitor, an inductor, and a diode connected in series with each other, and a first relatively high resistance in parallel with said diode, said capacitor and said inductor forming a series resonant circuit at a predetermined frequency; a second circuit connected across said thyratron switching tube and including a direct current voltage source and a second relatively high resistance in series with each other; and means including a bias capacitor and a resistor connected in series across said thyratron switching tube for forming a current discharge path through said tube characterized by a long time constant relative to the half period associated with said predetermined frequency; and means for maintaining said thyratron switching tube heavily ionized for a length of time beyond the first half period of said predetermined frequency.

6. A time delay circuit, comprising:

a thyratron switching tube;

a first circuit connected across said switching tube and including a capacitive device, an inductive device and a unidirectional current conducting device forming a series resonant circuit of a predetermined frequency when said switching tube and said unidirectional current conducting device conduct oscillating current in a given direction;

a first relatively high resistance in parallel with said unidirectional current conducting device;

a second circuit connected across said switching tube and including a unidirectional current source in series with a second relatively high resistance;

and means for maintaining said switching tube conducting for a substantial time after the first half cycle of oscillation;

whereby said switching tube presents a low impedance and said unidirectional current conducting device presents a high impedance to oscillating current flowing opposite said given direction and of a frequency higher than said predetermined frequency, thereby to produce a delay pulse of substantial amplitude across said unidirectional current conducting device.

7. The invention according to claim 6, wherein said means for maintaining said switching tube conducting comprises a capacitor and a resistor connected in series across said switching tube, the circuit values of said capacitor and resistor being selected to form a discharge path through said switching tube having a time constant that is substantially longer than the half period associated with said predetermined frequency.

8. The invention according to claim 7, wherein the capacitance of said capacitive device is substantially higher than that of said unidirectional current conducting device.

9. The invention according to claim 7, wherein said unidirectional current conducting device comprises a gas discharge tube capable of carrying at least one ampere of current.

10. The invention according to claim 7, wherein said unidirectional current conducting device comprises a thyratron tube connected as a diode.

11. The invention according to claim 7, wherein said unidirectional current conducting device comprises a solid state device with inherently large charge carrier storage.

12. A time delay circuit, comprising:

a thyratron switching tube;

a first circuit connected across said switching tube and including a capacitor, an inductor and a diode forming a series resonant circuit of a predetermined frequency when said switching tube and said diode conduct oscillating current in a given direction;

a first relatively high resistance in parallel with said diode;

a second circuit connected across said switching tube and including a direct current voltage source in series with a second relatively high resistance;

and means for maintaining said switching tube conducting for a substantial time after the first half cycle of oscillation;

said means including a bias capacitor and a resistor connected in series across said switching tube and forming therewith a current discharge path characterized by a long time constant relative to the half period associated with said predetermined frequency;

whereby said switching tube presents a low impedance and said unidirectional current conducting device presents a high impedance to oscillating current flowing opposite said given direction and of a frequency higher than said predetermined frequency, thereby to produce a delay pulse of substantial amplitude across said unidirectional current conducting device.

References Cited by the Examiner

UNITED STATES PATENTS

| | | | |
|---|---|---|---|
| 2,423,304 | 7/47 | Fitch | 328—68 |
| 2,883,535 | 4/59 | Creveling et al. | 328—210 |
| 2,891,155 | 6/59 | Carr et al. | 328—67 |
| 2,967,275 | 1/61 | Brown | 328—67 |
| 3,056,088 | 9/62 | Stearns | 328—68 |

JOHN W. HUCKERT, *Primary Examiner.*